United States Patent
Kwak

(10) Patent No.: US 7,519,018 B2
(45) Date of Patent: Apr. 14, 2009

(54) METHOD FOR PHYSICAL LAYER AUTOMATIC REPEAT REQUEST FOR A SUBSCRIBER UNIT

(75) Inventor: Joseph A. Kwak, Bolingbrook, IL (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/085,187

(22) Filed: Feb. 27, 2002

(65) Prior Publication Data

US 2003/0039219 A1 Feb. 27, 2003

Related U.S. Application Data

(63) Continuation of application No. 09/939,410, filed on Aug. 24, 2001.

(51) Int. Cl.
*H04B 7/216* (2006.01)

(52) U.S. Cl. ............... 370/320; 370/310; 370/310.2; 370/428; 370/465; 455/69

(58) Field of Classification Search ........... 370/310, 370/431, 437, 438, 208, 252, 310.2, 314, 370/320, 328–330, 335, 342, 349, 412, 413, 370/428, 465; 455/68, 69
See application file for complete search history.

(56) References Cited

U.S. PATENT DOCUMENTS

| | | | |
|---|---|---|---|
| 4,912,705 A | 3/1990 | Paneth et al. | |
| 5,101,406 A * | 3/1992 | Messenger | 370/349 |
| 5,280,498 A | 1/1994 | Tymes et al. | |
| 5,345,439 A | 9/1994 | Marston | |
| 5,345,600 A | 9/1994 | Davidson | |
| 5,351,016 A | 9/1994 | Dent | |
| 5,544,196 A | 8/1996 | Tiedemann, Jr. et al. | |
| 5,570,369 A | 10/1996 | Jokinen | |
| 5,648,969 A | 7/1997 | Pasternak et al. | |
| 5,657,325 A | 8/1997 | Lou et al. | |
| 5,715,260 A | 2/1998 | Black et al. | |
| 5,726,978 A * | 3/1998 | Frodigh et al. | 370/252 |
| 5,729,557 A | 3/1998 | Gardner et al. | |

(Continued)

FOREIGN PATENT DOCUMENTS

CA 2352696 5/2001

(Continued)

OTHER PUBLICATIONS

"Hybrid ARQ Methods for FDD in Release 2000," TSG-RAN Working Group 1 Meeting #14, Oulu, Finland, Jul. 4-7, 2000.

(Continued)

*Primary Examiner*—Firmin Backer
*Assistant Examiner*—Nguyen Ngo
(74) *Attorney, Agent, or Firm*—Volpe and Koenig, P.C.

(57) ABSTRACT

A method for physical automatic repeat request by a subscriber unit. A physical layer at the transmitter receives data and formats the received data into packets having a particular encoding/data modulation. The physical layer contains n channels which transmit the packets and retransmits packets upon failure to receive a corresponding acknowledgment for a given packet. An adaptive modulation and coding controller in the transmitter collects retransmission statistics and adjusts the particular encoding/data modulations using the collected statistics.

4 Claims, 3 Drawing Sheets

U.S. PATENT DOCUMENTS

| | | | |
|---|---|---|---|
| 5,828,677 A * | 10/1998 | Sayeed et al. | 714/774 |
| 5,838,267 A | 11/1998 | Wang et al. | |
| 5,918,156 A | 6/1999 | Tanabe | |
| 5,946,320 A | 8/1999 | Decker | |
| 5,954,839 A | 9/1999 | Park et al. | |
| 5,956,624 A | 9/1999 | Hunsinger et al. | |
| 5,982,760 A * | 11/1999 | Chen | 370/335 |
| 5,983,382 A | 11/1999 | Pauls | |
| 5,983,383 A | 11/1999 | Wolf | |
| 5,983,384 A | 11/1999 | Ross | |
| 6,021,123 A | 2/2000 | Mimura | |
| 6,021,124 A | 2/2000 | Haartsen | |
| 6,049,549 A | 4/2000 | Ganz et al. | |
| 6,064,692 A * | 5/2000 | Chow | 375/219 |
| 6,128,276 A | 10/2000 | Agee | |
| 6,130,918 A | 10/2000 | Humphrey et al. | |
| 6,134,694 A | 10/2000 | Uebayashi et al. | |
| 6,138,260 A | 10/2000 | Ketseoglou | |
| 6,145,108 A | 11/2000 | Ketseoglou | |
| 6,154,489 A | 11/2000 | Kleider et al. | |
| 6,189,123 B1 | 2/2001 | Anders Nystrom et al. | |
| 6,208,663 B1 * | 3/2001 | Schramm et al. | 370/465 |
| 6,212,240 B1 * | 4/2001 | Scheibel et al. | 375/261 |
| 6,212,659 B1 | 4/2001 | Zehavi | |
| 6,215,827 B1 | 4/2001 | Balachandran et al. | |
| 6,226,520 B1 | 5/2001 | Jeoung | |
| 6,233,711 B1 | 5/2001 | Murayama et al. | |
| 6,262,994 B1 * | 7/2001 | Dirschedl et al. | 370/465 |
| 6,272,183 B1 | 8/2001 | Berens et al. | |
| 6,275,488 B1 | 8/2001 | Cudak et al. | |
| 6,289,003 B1 | 9/2001 | Raitola et al. | |
| 6,301,479 B1 * | 10/2001 | Roobol et al. | 455/436 |
| 6,308,294 B1 | 10/2001 | Ghosh et al. | |
| 6,317,418 B1 | 11/2001 | Raitola et al. | |
| 6,359,877 B1 | 3/2002 | Rathonyi et al. | |
| 6,366,601 B1 | 4/2002 | Ghosh et al. | |
| 6,370,669 B1 | 4/2002 | Eroz et al. | |
| 6,421,803 B1 | 7/2002 | Persson et al. | |
| 6,449,246 B1 * | 9/2002 | Barton et al. | 370/210 |
| 6,470,391 B2 | 10/2002 | Takamoto et al. | |
| 6,473,399 B1 | 10/2002 | Johansson et al. | |
| 6,519,065 B1 | 2/2003 | Colbourne et al. | |
| 6,522,650 B1 | 2/2003 | Yonge et al. | |
| 6,529,561 B2 | 3/2003 | Sipola | |
| 6,587,985 B1 | 7/2003 | Fukushima et al. | |
| 6,601,207 B1 | 7/2003 | Vanttinen | |
| 6,621,807 B1 | 9/2003 | Jung et al. | |
| 6,647,076 B1 | 11/2003 | Schenk et al. | |
| 6,671,266 B1 | 12/2003 | Moon et al. | |
| 6,735,180 B1 | 5/2004 | Malkamäki et al. | |
| 6,760,860 B1 | 7/2004 | Fong et al. | |
| 6,831,910 B1 | 12/2004 | Moon et al. | |
| 6,895,010 B1 | 5/2005 | Chang et al. | |
| 6,907,005 B1 * | 6/2005 | Dahlman et al. | 370/236 |
| 6,931,569 B2 | 8/2005 | Fong et al. | |
| 6,956,855 B1 | 10/2005 | Chang | |
| 7,149,192 B2 * | 12/2006 | Kwak | 370/320 |
| 7,164,654 B2 * | 1/2007 | Hunzinger et al. | 370/230 |
| 2002/0034182 A1 | 3/2002 | Mallory | |
| 2002/0037000 A1 | 3/2002 | Park et al. | |
| 2002/0037058 A1 | 3/2002 | Birru | |
| 2002/0064167 A1 | 5/2002 | Khan et al. | |
| 2002/0191544 A1 | 12/2002 | Cheng et al. | |
| 2003/0039226 A1 | 2/2003 | Kwak | |

FOREIGN PATENT DOCUMENTS

| | | |
|---|---|---|
| CN | 1275279 | 2/1999 |
| CN | 1277766 | 12/2000 |
| EP | 0797327 | 9/1997 |
| EP | 0859475 | 8/1998 |
| JP | 01-141431 | 6/1989 |
| JP | 09-116597 | 5/1997 |
| JP | 09-298575 | 11/1997 |
| JP | 11-046217 | 2/1999 |
| JP | 2000-004196 | 1/2000 |
| KR | 2003-0004618 | 1/2003 |
| KR | 2003/0004618 | 1/2003 |
| KR | 2003-4618 | 1/2003 |
| KR | 20030004618 | 1/2003 |
| RU | 97118086 | 7/1999 |
| RU | 2179370 | 2/2002 |
| RU | 2195768 | 12/2002 |
| RU | 2001126714 | 7/2003 |
| RU | 2282310 | 10/2003 |
| RU | 2221338 | 1/2004 |
| RU | 2221339 | 1/2004 |
| RU | 2235432 | 8/2004 |
| RU | 2294055 | 1/2006 |
| WO | 97/37459 | 10/1997 |
| WO | 98/31106 | 7/1998 |
| WO | 99/09698 | 2/1999 |
| WO | 99/12303 | 3/1999 |
| WO | 9/66675 | 12/1999 |
| WO | 99/66675 | 12/1999 |
| WO | 00/10298 | 2/2000 |
| WO | 01/01624 | 1/2001 |
| WO | 02/33877 | 4/2002 |
| WO | 2004/038990 | 6/2004 |

OTHER PUBLICATIONS

"Physical Layer Aspects of UTRA High Speed Downlink Packet Access," 3GPP TR 25.848 V4.0.0 (Mar. 2001), pp. 1-89.

3GPP TR 25.848 V4.0.0 (Mar. 2001), 3$^{rd}$ Generation Partnership Project; Technical Specification Group Radio Access Network; Physical layer aspects of UTRA High Speed Downlink Packet Access (Release 4), p. 50.

Erikkson et al. "Comparison of Link Quality Control Strategies for Packet Data Services in EDGE." Vehicular Technology Conference, 1999 IEEE. May 16, 1999, pp. 938-942.

Sayeed, "Throughput Analysis and Design of Fixed and Adaptive ARQ/Diversity Systems for Slow Fading Channels." Global Telecommunications Conference, 1998. Nov. 8, 1998, pp. 3686-3691.

Shiozaki et al. "A Hybrid ARQ Scheme With Adaptive Forward Error Correction for Satellite Communications." IEEE Transactions on Communications, Apr. 1, 1991, pp. 482-484.

Bakhtiyari et al. "Practical Implementation of a Mobile Data Link Protocol With A Type II Hybrid ARQ Scheme and Code Combing." Personal Communication—Freedom Through Wireless Technology. Proceedings of the Vehicular Technology Conference, May 18, 1993, pp. 774-777.

"Hybrid ARQ Methods for FDD in Release in 2000," TSG-RAN Working Group 1 Meeting #14, Oulu, Finland, (Jul. 4-7, 2000).

3GPP, "Physical Layer Aspects of UTRA High Speed Downlink Packet Access," 3GPP TR 25.848 V4.0.0 (Mar. 2001), pp. 1-89.

Rohling et al. "Performance Comparison of Different Multiple Access Schemes for the Downlink of an OFDM Communication System", 1997 IEEE 47$^{th}$ Vehicular Technology Conference, May 1997, vol. 3, p. 1368, (May 1997).

3GPP, 3$^{rd}$ Generation Partnership Project; Technical Specification Group Radio Access Network; Physical layer aspects of UTRA High Speed Downlink Packet Access (Release 4), TR 25.848 V4.0.0 (Mar. 2001), p. 50.

Erikkson et al. "Comparison of Link Quality Control Strategies for Packet Data Services in EDGE." Vehicular Technology Conference, 1999 IEEE, pp. 938-942, (May 16, 1999).

Sayeed, "Throughput Analysis and Design of Fixed and Adaptive ARQ/Diversity Systems for Slow Fading Channels." Global Telecommunications Conference, 1998, pp. 3686-3691 (Nov. 8, 1998).

Shiozaki et al. "A Hybrid ARQ Scheme With Adaptive Forward Error Correction for Satellite Communications." IEEE Transactions on Communications, pp. 482-484 (Apr. 1, 1991).

Bakhtiyari et al. "Practical Implementation of a Mobile Data Link Protocol With A Type II Hybrid ARQ Scheme and Code Combing," Personal Communication—Freedom Through Wireless Technology. Proceedings of the Vehicular Technology Conference, pp. 774-777 (May 18, 1993).

Kim et al. "On Hybrid ARQ of Reverse Channel in 1xEV-DV", Montreal Canada, C50-20010709-019 SAMSUNG_Reverse Channel HARQ.doc, (Jul. 10, 2001).

3GPP, 3rd Generation Partnership Project; Technical Specification Group Radio Access Network; Report on Hybrid ARQ Type II/III (Release 2000), 3GPP TR 25.835 V1.0.0 (Sep. 2000).

Stallings, "Networking Standards—A Guide to OSI, ISDN, LAN, and MAN Standards", p. 37, (Feb. 1993).

Wang et al. "Error Control and Concealment for Video Communication—A Review[1]".

"Physical Layer Aspects of UTRA High Speed Downlink Packet Access," 3GPP TR 25.848 V4.0.0 (Mar. 2001), pp. 1-89.

Kim et al. "On Hybrid ARQ of Reverse Channel in 1xEV-DV", Montreal Canada Jul. 10, 2001, C50-20010709-019 SAMSUNG_Reverse Channel HARQ.doc.

3G TR 25.835 V1.0.0 (Sep. 2000) 3rd Generation Partnership Project; Technical Specification Group Radio Access Network; Report on Hybrid ARQ Type II/III (Release 2000).

William Stallings "Networking Standards—A Guide to OSI, ISDN, LAN, and MAN Standards", p. 37, Feb. 1993.

3GPP, "Physical Layer Aspects of UTRA High Speed Downlink Packet Access," 3GPP TR 25.848 V4.0.0 (Mar. 2001), pp. 1-89.

3GPP, 3rd Generation Partnership Project; Technical Specification Group Radio Access Network; Report on Hybrid ARQ Type II/III (Release 2000), 3GPP TR 25.835 V1.0.0 (Sep. 2000).

Muneta et al., "A New Frequency-Domain Link Adaptation Scheme for Broadband OFDM Systems," IEEE VTS 50th Vehicular Technology Conference, vol. 1, pp. 253-257 (1999).

Erikkson et al. "Comparison of Link Quality Control Strategies for Packet Data Services in EDGE." Vehicular Technology Conference, 1999 IEEE, pp. 938-942, (May 16, 1999).

* cited by examiner

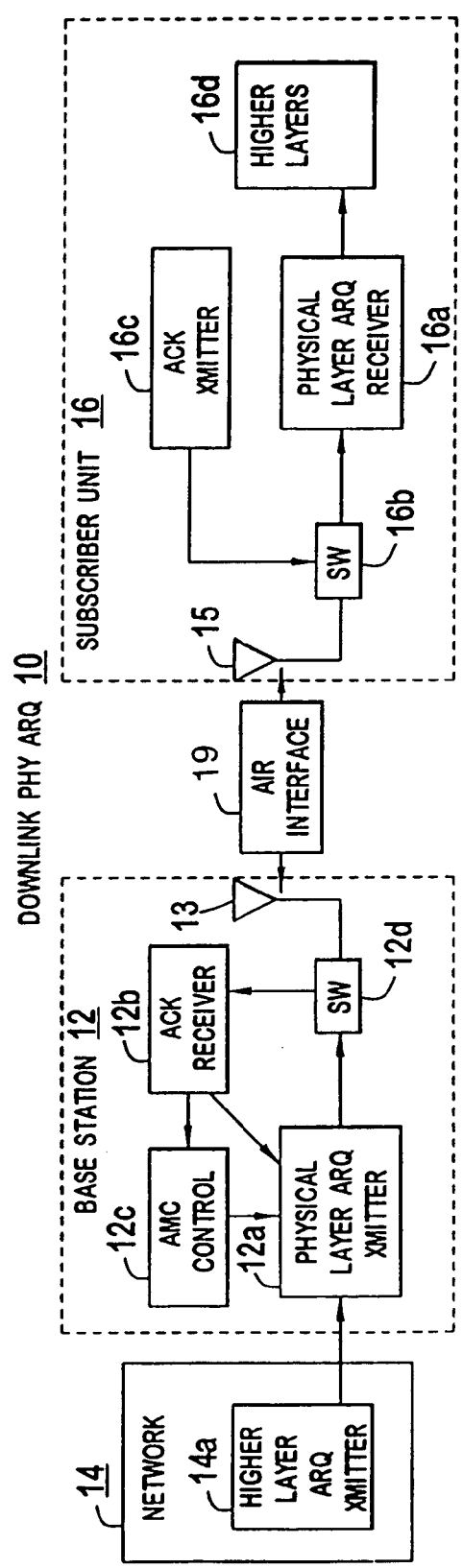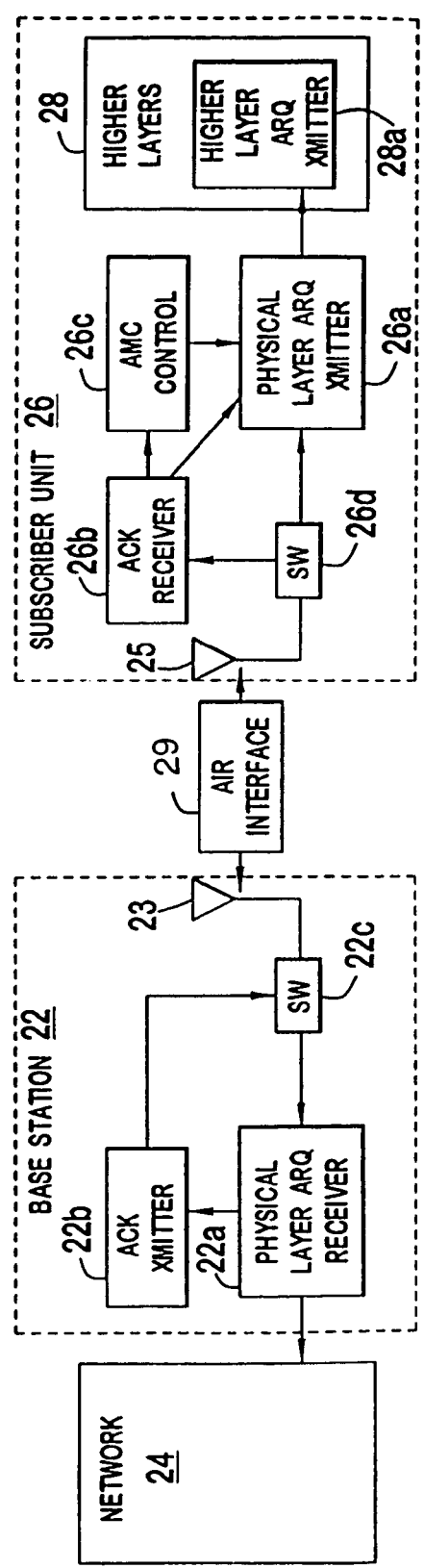
FIG. 1A
FIG. 1B

METHOD FOR PHYSICAL LAYER AUTOMATIC REPEAT REQUEST FOR A SUBSCRIBER UNIT

This application is a continuation of Application No. 09/939,410, filed Aug. 24, 2001.

BACKGROUND

The present invention relates to wireless communication systems. More particularly, it relates to a modification to such systems by employing a physical layer (PHY) automatic repeat request (ARQ) scheme.

Proposed broadband fixed wireless access (BFWA) communication systems, using either single carrier-frequency domain equalization (SC-FDE) or orthogonal frequency division multiplex (OFDM) plan on using a high speed downlink packet access (HSDPA) application. This application will transmit downlink packet data at high speeds. In BFWA, a building or group of buildings are connected, either wirelessly or wired, and operate as a single subscriber site. The data demand for such a system is quite high for the single site's multiple end users requiring large bandwidths.

The current proposed system employs a layer 2 automatic repeat request (ARQ) system. Data blocks unsuccessfully transmitted to the subscribers are buffered and retransmitted from layer 2. The data blocks stored in layer 2 are typically large, are transmitted for high signal to noise ratio (SNR) reception, are received with a low block error rate (BLER), and are infrequently retransmitted. Additionally, layer 2 ARQ signaling is typically slow requiring large buffers and long retransmission intervals.

Accordingly, it is desirable to have alternatives in addition to a layer 2 ARQ system.

SUMMARY

A physical automatic request repeat system comprises a transmitter and a receiver. A physical layer transmitter, at the transmitter, receives data and formats the received data into packets having a particular encoding/data modulation. The physical layer transmitter contains n channels which transmit the packets and retransmits packets in response to not receiving a corresponding acknowledgment for a given packet. An adaptive modulation and coding controller in the transmitter collects retransmission statistics and adjusts the particular encoding/data modulations using the collected statistics. The receiver has a physical layer n-channel receiver for receiving the packets. The receiver contains an n-channel hybrid ARQ combiner/decoder which combines packet transmissions, decodes packets and detects packet errors. The receiver contains an acknowledgment transmitter which transmits an acknowledgment for each packet, if that packet has an acceptable error rate. The receiver contains an in-sequence delivery element which delivers acceptable packets to higher layers.

BRIEF DESCRIPTION OF THE DRAWINGS

FIGS. 1a and 1b are simplified block diagrams of downlink and uplink physical ARQs.

DETAILED DESCRIPTION OF THE PREFERRED EMBODIMENTS

Figure 2:
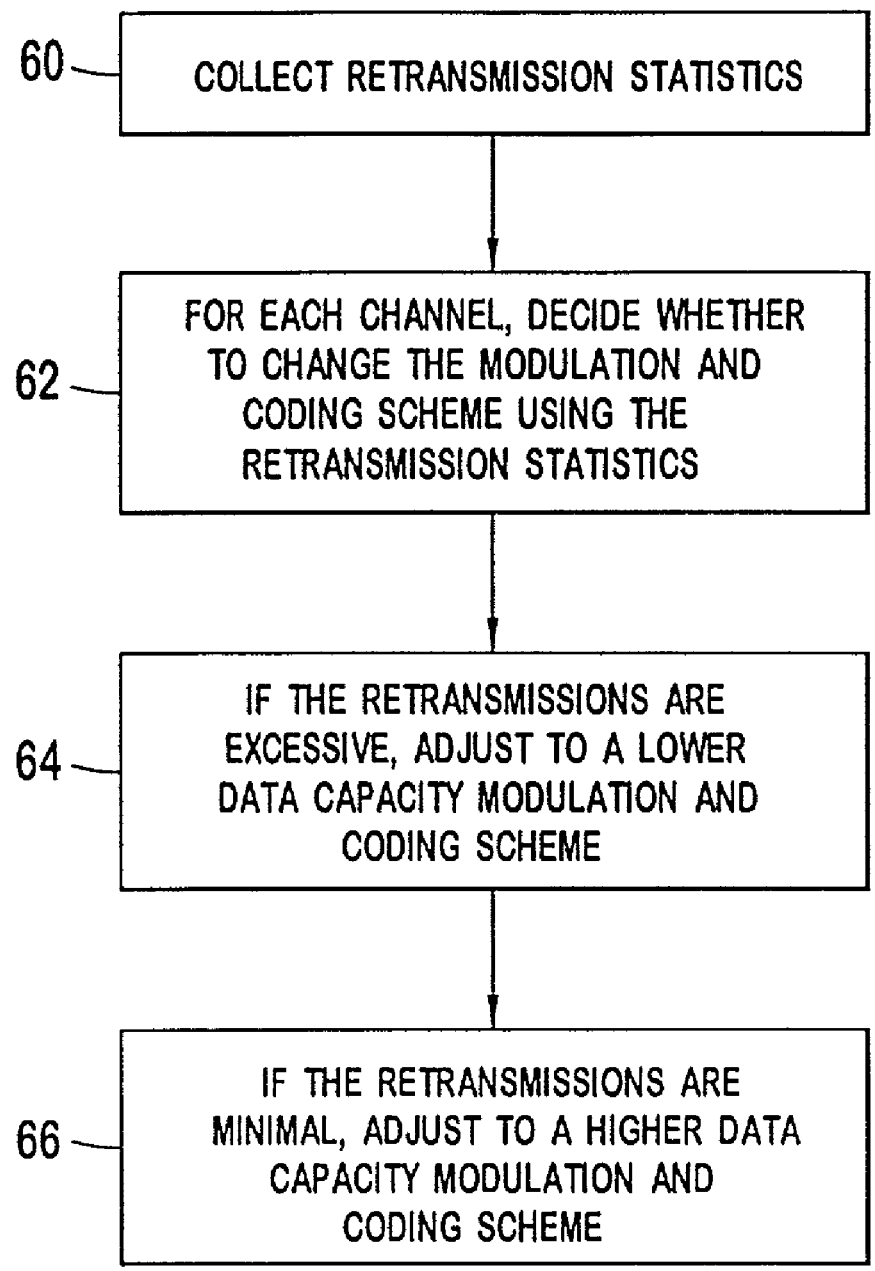
FIG. 2 is a flow chart for using retransmission statistics for adaptive modulation and coding.

FIGS. 1a and 1b respectively show a downlink physical ARQ 10 and uplink physical ARQ 20.

The downlink physical ARQ 10 comprises a base station 12 receiving packets from the higher layer ARQ transmitter 14a provided in network 14. The packets from transmitter 14a are applied to the physical layer ARQ transmitter 12a in base station 12. The ARQ transmitter 12a encodes the data with a forward error correcting code (FEC), appends error check sequences (ECSs), modulates the data as directed by the adaptive modulation and coding (AMC) controller 12c, such as by using binary phase shift keying (BPSK), quadrature phase shift keying (QPSK) or m-ary quadrature amplitude modulation (i.e. 16-QAM or 64-QAM). Additionally, for orthogonal frequency division multiple access (OFDMA), the AMC controller 12c may vary the subchannels used to carry the packet data. The physical layer ARQ transmitter 12a transmits packets to the subscriber unit 16 through air interface 14 by way of switch, circulator or duplexor 12d and antenna 13. The transmitter 12a also temporarily stores the message for retransmission, if necessary, in a buffer memory incorporated in the transmitter 12a.

Antenna 15 of subscriber unit 16 receives the packet. The packet is input into physical layer ARQ receiver 16a through switch, circulator or duplexor 16b. At the receiver 16a, the packet is FEC decoded and checked for errors using the ECS. The receiver 16a then controls acknowledgment transmitter 16c to either acknowledge (ACK) receipt of a packet with an acceptable error rate or to request retransmission by, preferably, withholding an acknowledgment signal or transmitting a negative acknowledgment (NAK).

The ACK is sent by ACK transmitter 16c to the base station 12 through switch 16b and antenna 15. The ACK is sent via the air interface 19 to antenna 13 of base station 12. The received ACK is processed by an acknowledgment receiver 12b in the base station. The ACK receiver 12b delivers the ACK/NAKs to the adaptive modulation and coding (AMC) controller 12c and to the transmitter 12a. The AMC controller 12c analyzes the channel quality to the subscriber unit 16 using statistics of the received ACKs and may vary the FEC encoding and modulation techniques of subsequent transmissions of the message, as will be described in more detail. If the subscriber unit 16 acknowledges receipt of the packet, receipt of this ACK at base station 12 causes the original packet, which was temporarily stored in a buffer memory, to be cleared in readiness for the next packet.

If no ACK is received or a NAK is received, the physical layer transmitter 12a retransmits the original message or selectively modified version of the original message to subscriber 16. At the subscriber unit 16, the retransmission is combined with the original transmission, if available. This technique facilitates receipt of a correct message by use of data redundancy or selective repeat combining. The packets having an acceptable error rate are transferred to higher layers 16d for further processing. The acceptable received packets are delivered to the higher layers 16d in the same data order in which the data was provided to transmitter 12a in the base station (i.e. in-sequence delivery). The maximum number of retransmissions is limited to an operator-defined integer value, such as in the range of 1 to 8. After the maximum number of retransmissions are attempted, the buffer memory is cleared for use by the next packet. Decoding an acknowledgment using small packets at the physical layer reduces transmission delays and message handling time.

Since PHY ARQ occurs at the physical layer, the number of retransmission occurrences for a particular channel, retransmission statistics, is a good measure of that channel's quality. Using the retransmission statistics, the AMC controller 12c may vary the modulation and coding schemes for that channel, as shown in FIG. 2. Additionally, the retransmission statistics can also be combined with other link quality measurements, such as bit error rates (BERs) and block error rates (BLERs), by the AMC controller 12c to gauge the channel quality and determine whether a change in the modulation and coding scheme is required.

To illustrate for SC-FDE, the retransmission occurrences for a particular channel are measured to produce retransmission statistics, (60). A decision on whether to change the modulation scheme is made using the retransmission statistics, (62). If the retransmissions are excessive, a more robust coding and modulation scheme is used, (64), usually at a reduced data transfer rate. The AMC controller 12c may increase the spreading factor and use more codes to transfer the packet data. Alternately or additionally, the AMC controller may switch from a high data throughput modulation scheme to a lower one, such as from 64-QAM to 16-QAM or QPSK. If the rate of retransmissions is low, a switch to a higher capacity modulation scheme is made, such as from QPSK to 16-ary QAM or 64-ary QAM, (66). The decision preferably uses both the retransmission rate and other link quality measurements signaled from the receiver, such as BER or BLER, (62). The decision limits are preferably set by the system operator.

For OFDMA, the retransmission occurrences are used to monitor the channel quality of each subchannel. If the retransmission rate or retransmission rate/link quality for a particular subchannel indicates poor quality, that subchannel may be selectively nulled from the OFDM frequency set, (64), in order to preclude use of such poor quality subchannels for some future period. If the retransmission rate or retransmission rate/link quality indicates high quality, a previously nulled subchannels may be added back to the OFDM frequency set, (66).

Using the retransmission occurrences as a basis for AMC provides a flexibility to match the modulation and coding scheme to the average channel conditions for each user. Additionally, the retransmission rate is insensitive to measurement error and reporting delay from the subscriber unit 16.

The uplink ARQ 20 is similar in nature to the downlink ARQ 10 and is comprised of a subscriber unit 26 in which packets from a higher layer ARQ transmitter 28a of the higher layers 28 are transferred to physical layer ARQ transmitter 26a. The message is transmitted to the base station antenna through switch 26d, subscriber antenna 25 and air interface 29. The AMC controller, likewise, may vary the modulation and coding scheme using the retransmission statistics of a channel.

Physical layer ARQ receiver 22a, similar to receiver 16a of FIG. 1a, determines if the message has an acceptable error rate requiring retransmission. The acknowledgment transmitter reports status to subscriber unit 26, causing the transmitter 26a to retransmit or alternatively to clear the original message temporarily stored at transmitter 26a in readiness to receive the next message from the higher layers 28. Successfully received packets are sent to the network 24 for further processing.

Although not shown for purposes of simplicity, the system is preferably used for a HSDPA application in a BFWA system, although other implementations may be used. The BFWA system may use frequency division duplex or time division duplex SC-FDE or OFDMA. In such a system, the base station and all of the subscribers are in fixed locations. The system may comprise a base station and a large number of subscriber units. Each subscriber unit may serve multiple users within one building or several neighboring buildings, for example. These applications typically require a large bandwidth due to the large number of end users at one subscriber unit site.

A PHY ARQ deployed in such a system is transparent to the higher layers, such as the medium access controllers (MACs). As a result, PHY ARQ can be used in conjunction with higher layer ARQs, such as layer 2. In such cases, the PHY ARQ reduces the retransmission overhead of the higher layer ARQs.

Figure 3:
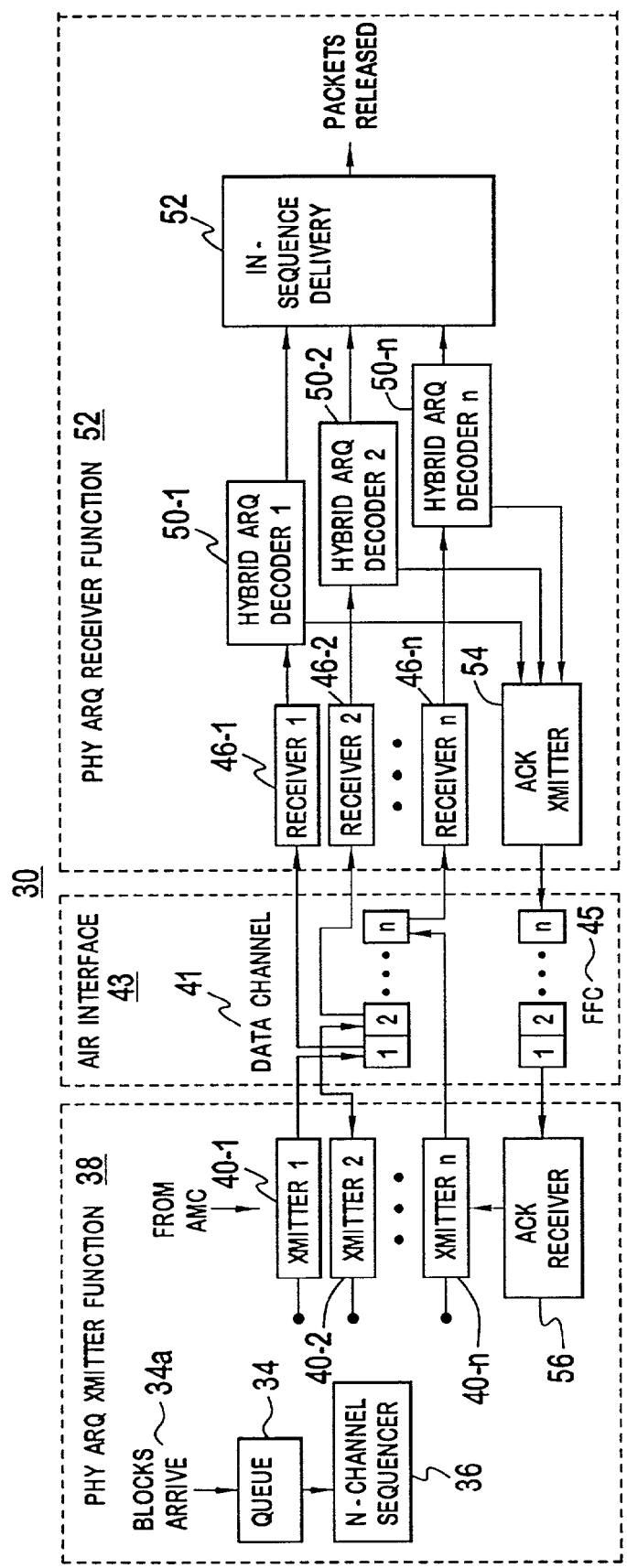
FIG. 3 is block diagram showing a multi-channel stop and wait architecture.

FIG. 3 is an illustration of an N-channel stop and wait architecture for a PHYARQ 30. The Physical Layer ARQ transmit function 38 may be located at the base station, subscriber unit or both depending on whether downlink, uplink or both PHYARQs are used. Blocks 34a of data arrive from the network. The network blocks are placed in a queue 34 for transmission over the data channel 41 of the air interface 43. An N-channel sequencer 36 sends data of the blocks sequentially to the N transmitters 40-1 to 40-n. Each transmitter 40-1 to 40-n is associated with a transmit sequence in the data channel 41. Each transmitter 40-1 to 40-n FEC encodes and provides ECS for the block data to produce packets for AMC modulation and transmission in the data channel 41. The FEC encoded/ECS data is stored in a buffer of the transmitter 40-1 to 40-n for possible retransmission. Additionally, control information is sent from the PHYARQ transmitter 38 to synchronize reception, demodulation and decoding at the receivers 46-1 to 46-n.

Each of the N receivers 46-1 to 46-n receives the packet in its associated timeslot. The received packet is sent to a respective hybrid ARQ decoder 50-1 to 50-n (50). The hybrid ARQ decoder 50 determines the error rate, such as BER or BLER, for the received packet. If the packet has an acceptable error rate, it is released to the higher levels for further processing and an ACK is sent by the ACK transmitter 54. If the error rate is unacceptable or no packet was received, no ACK is sent or a NAK is sent. Packets with unacceptable error rates are buffered at the decoder 50 for potential combining with a retransmitted packet.

One approach for combining packets using turbo codes is as follows. If a turbo encoded packet is received with an unacceptable error rate, the packet data is retransmitted to facilitate code combining. The packet containing the same data is encoded differently. To decode the packet data, both packets are processed by the turbo decoder to recover the original data. Since the second packet has a different encoding, its soft symbols are mapped to different points in the decoding scheme. Using two packets with different encoding adds coding diversity and transmission diversity to improve the overall BER. In another approach, the identical signal is transmitted. The two received packets are combined using a maximum ratio combining of symbols. The combined signal is subsequently decoded.

The ACK for each receiver 46-1 to 46-n is sent in a fast feedback channel (FFC) 45. The fast feedback channel 45 is preferably a low latency channel. For a time division duplex system, the ACKs may be sent in idle periods between upstream and downstream transmissions. The FFC 45 is preferably a low speed, high bandwidth CDMA channel overlaying other in-band transmissions. The FFC CDMA codes and modulations are selected to minimize interference to other in-band transmissions. To increase the capacity of such a FFC 45, multiple codes may be used.

The ACK receiver 56 detects the ACKs and indicates to the corresponding transmitter 40-1 to 40-n whether the ACK was received. If the ACK was not received, the packet is retransmitted. The retransmitted packet may have a different modulation and coding scheme as directed by the AMC controller 12c, 26c. If the ACK is received, the transmitter 40-1 to 40-n clears the previous packet from the buffer and accepts a subsequent packet for transmission.

The number of transmitters and receivers N is based on various design considerations, such as the channel capacity and ACK response time. For the preferred system previously described, a 2-channel architecture is preferably utilized, with even and odd transmitters and receivers.

The PHY ARQ technique of the preferred embodiment provides a 7 db gain in signal to noise ratio (SNR) as compared to a system using only higher layer ARQ. This occurs by operating at higher block error rates (BLERs) (5-20% BLER) and using smaller block sizes for layer 1 than is practical with higher layer ARQ alone. The decreased SNR requirement allows for: increased capacity by switching to high order modulation employing an adaptive modulation and coding (AMC) technique; lower customer premise equipment (CPE) costs by using lower grade RF (radio frequency) components with the PHY ARQ compensating for reduced implementation performance; increased downlink range which extends the cell radius; reduced downlink power in the base station (BS) to minimize cell-cell interference; and increased power amplifier (PA) back-off when employing a multi-carrier technique.

What is claimed is:

1. A method for adjusting data modulation at a subscriber unit, comprising:
   receiving data at a physical layer transmitter for transmission, wherein the received data is received in data blocks from a higher layer ARQ mechanism;
   formatting the received data into packets for transmission, wherein the packets are smaller in size than the data blocks, and each packet having a forward error correction (FEC) encoding/data modulation, and wherein the packets are transmitted using an orthogonal frequency division multiple access (OFDMA) air interface;
   appending an error check sequence for each packet;
   transmitting the packets;
   storing the packets for retransmission in a buffer memory incorporated into the physical layer transmitter;
   monitoring a return channel for receipt of an acknowledgment for each packet that packet has been received;
   limiting the number of retransmissions to an operator-defined integer value;
   clearing the buffer memory after the integer value is reached;
   retransmitting an original or selectively modified packet at the physical layer transmitter, if an acknowledgment for that packet has not been received within a predetermined period of time; and wherein the physical layer ARQ mechanism and physical layer transmitter operate transparently with respect to the higher layer ARO mechanism;
   receiving and demodulating received packets at a physical layer receiver;
   transmitting a corresponding acknowledgment in an acknowledgment generator for a given packet at the physical layer receiver, wherein a mechanism configured to receive the corresponding acknowledgment for the given packet operates transparently with respect to the higher layer ARQ mechanism;
   collecting retransmission statistics;
   adjusting the particular encoding/data modulation of each packet using the collected retransmission statistics;
   wherein if the collected retransmission statistics indicate a low number of retransmissions, a higher capacity encoding/data modulation scheme is selected as the particular encoding/data modulation and if the collected retransmission statistics indicate a high number of retransmissions, a lower capacity encoding/data modulation scheme is selected as the particular encoding/data modulation;
   combining the retransmitted original or selectively modified packet with the transmitted packets; and
   selectively nulling subchannels from an OFDM frequency set wherein the use of a poor quality subchannel is precluded for a predetermined period and adding a previously nulled subchannel back into the OFDM frequency set where a retransmission rate or link quality indicates a high quality for the previously nulled subchannel.

2. The method of claim 1 wherein the return channel is a fast feedback channel when the packets are transmitted using a code division multiple access (CDMA) air interface.

3. The method of claim 1 further comprising:
   identifying a packet as having an unacceptable error rate responsive to receipt of a negative acknowledgment.

4. A user equipment, comprising:
   a higher layer automatic repeat request (ARQ) mechanism configured to generate data for transmission;
   a physical layer transmitter configured to receive the data for transmission from the higher layer ARQ mechanism, and wherein the received data is received in data blocks from the higher layer ARQ mechanism, and to format the received data into packets for transmission, wherein the packets are smaller in size than the data blocks, and each packet has a forward error correction (FEC) encoding/data modulation, and wherein the packets are transmitted using an orthogonal frequency division multiple access (OFDMA) air interface, the physical layer transmitter configured to retransmit an original or selectively modified packet at, if an acknowledgment for that packet has not been received within a predetermined period of time; and wherein the physical layer ARQ mechanism and physical layer transmitter operate transparently with respect to the higher layer ARQ mechanism;
   a physical layer receiver configured to receive and demodulate received packets and retransmission statistics;
   an ACK transmitter configured to transmit a corresponding acknowledgment for a given packet at the physical layer receiver, wherein a mechanism configured to receive the corresponding acknowledgment for the given packet operates transparently with respect to the higher layer ARQ mechanism; and
   an adaptive modulation and control (AMC) unit configured to adjust the particular encoding/data modulation of each packet using collected retransmission statistics; wherein if the collected retransmission statistics indicate a low number of retransmissions, a higher capacity encoding/data modulation scheme is selected as the particular encoding/data modulation and if the collected retransmission statistics indicate a high number of retransmissions, a lower capacity encoding/data modulation scheme is selected as the particular encoding/data modulation; and
   wherein subchannels from an OFDM frequency set are selectively nulled wherein the use of a poor quality subchannel is precluded for a predetermined period and adding a previously nulled subchannel back into the OFDM frequency set where a retransmission rate or link quality indicates a high quality for the previously nulled subchannel.

* * * * *

UNITED STATES PATENT AND TRADEMARK OFFICE
CERTIFICATE OF CORRECTION

PATENT NO. : 7,519,018 B2  Page 1 of 1
APPLICATION NO. : 10/085187
DATED : April 14, 2009
INVENTOR(S) : Joseph A. Kwak It is certified that error appears in the above-identified patent and that said Letters Patent is hereby corrected as shown below:

ON THE TITLE PAGE

At subject (56), U.S. PATENT DOCUMENTS, page 2, left column, after line beginning with "2002/0064167" insert --2002/0075867  6/2002  Herrmann--.

At subject (56), FOREIGN PATENT DOCUMENTS, page 2, right column, delete line beginning with "KR  2003-0004618  1/2003".

At subject (56), FOREIGN PATENT DOCUMENTS, page 2, right column, delete line beginning with "WO  9/66675  12/1999".

At subject (56), OTHER PUBLICATIONS, page 2, right column, on line beginning with "Protocol With" after the word "Code" delete "Combing" and insert therefor
--Combining--.

At subject (56), OTHER PUBLICATIONS, page 3, left column, on line beginning with "Protocol With" after the word "Code" delete "Combing" and insert therefor
--Combining--.

At column 3, line 37, before the word "previously" delete "a".

At claim 1, column 5, line 54, after the word "layer" delete "ARO" and insert therefor --ARQ--.

Signed and Sealed this

Nineteenth Day of January, 2010

David J. Kappos
*Director of the United States Patent and Trademark Office*